United States Patent [19]

Krumwiede et al.

[11] Patent Number: 4,747,883
[45] Date of Patent: May 31, 1988

[54] CONTINUOUSLY FLUSHED THERMOCOUPLE ASSEMBLY

[75] Inventors: John F. Krumwiede, Cresattown, Md.; Roy M. Sims, Lower Burrell, Pa.

[73] Assignee: PPG Industries, Inc., Pittsburgh, Pa.

[21] Appl. No.: 851,986

[22] Filed: Apr. 14, 1986

[51] Int. Cl.$^4$ ............................................. H01L 35/02
[52] U.S. Cl. .................................... 136/233; 136/234; 136/201; 136/231
[58] Field of Search ................ 374/179, 208; 136/218, 136/230–234, 201

[56] References Cited

U.S. PATENT DOCUMENTS

| | | | |
|---|---|---|---|
| 2,335,471 | 11/1943 | Ashcraft | 136/218 |
| 2,710,055 | 6/1955 | Betz | 136/218 |
| 2,810,005 | 10/1957 | Ray | 136/218 |
| 3,011,006 | 11/1961 | Nicholson | 136/234 |
| 3,537,911 | 11/1970 | Hynd | 136/234 |
| 3,672,222 | 6/1972 | Stelts et al. | 136/234 |
| 3,923,552 | 12/1975 | Parris | 136/234 |
| 4,075,035 | 2/1978 | Trevedy | 136/234 |
| 4,272,989 | 6/1981 | Rymarchyk et al. | 136/234 |
| 4,433,419 | 2/1984 | Williamson | 373/37 |

Primary Examiner—Barry S. Richman
Assistant Examiner—T. J. Wallen
Attorney, Agent, or Firm—Donald C. Lepiane; Robert A. Westerlund, Jr.

[57] ABSTRACT

A thermocouple assembly including a thermocouple probe having facilities mounted thereto to protect the probe, e.g. from the hostile environment of a mounting hole provided through a refractory wall of a glassmaking furnace into which the probe extends for measuring the temperature of molten glass contained by the furnace. The facilities to protect the probe include an outer sleeve disposed in surrounding relation to a selected portion of the probe to form a first annular space between the outer surface of the probe and the inner surface of the sleeve; facilities for sealing the first annular space from atmosphere outside thereof; and, facilities for continuously moving a corrosion-inhibiting gas into, through, and out of the first annular space to thereby flush any infiltrating oxygen an/or alkali-sulfate corrosives out of the first annular space. Additional facilities may also be provided to continuously flush any infiltrating oxygen and/or alkali-sulfate corrosives out of a second annular space internal to the probe.

16 Claims, 2 Drawing Sheets

CONTINUOUSLY FLUSHED THERMOCOUPLE ASSEMBLY

FIELD OF THE INVENTION

The present invention relates generally to the field of instruments for measuring elevated temperatures, and more particularly, to an improved continuously flushed thermocouple assembly, e.g. of the type for measuring the temperature of molten glass or the like.

TECHNOLOGICAL ENVIRONMENT OF THE INVENTION

In the manufacture of float glass, it is important to regularly monitor the temperature of molten glass within the melting tank at various locations and at different depths, in order to facilitate greater control over the temperature profile of the molten glass, to thereby provide greater control over resultant glass quality.

In general, the temperature profile of a molten pool of glass is determined by inserting a plurality of thermocouple probes at selected locations through the bottom of the melting furnace into the molten pool of glass. In accordance with known practice, each thermocouple probe includes one or more thermocouple elements enclosed by an inner sheath and an outer sheath. The inner sheath is generally made of a high-temperature metal, e.g. molybdenum, and the outer sheath is generally comprised of a first portion and a second portion, the first and second portions being suitably joined together. The first portion of the outer sheath is immersed in the molten glass, and is generally made of molybdenum, because molybdenum does not readily react with the oxygen in the molten glass. The deterioration of the molybdenum first portion is therefore, slow. The second portion of the outer sheath is exposed to the atmosphere, and is generally made of stainless steel, since stainless steel does not readily oxidize in heated air, i.e. below temperatures of about 1,700° F. The stainless steel second portion and the molybdenum first portion of the outer sheath are generally brazed together. A problem with brazed joints is that when the probe is heated in use, the brazed joints have a high incidence of fracturing. When the brazed joint fractures, air and/or molten glass move into the sheath, deteriorating the sheath and/or the thermocouple elements. To eliminate the presence of air in the outer sheath, it is common practice to continuously purge the annular space between the inner and outer sheaths with forming gas. This is accomplished by connecting purging facilities to the end of the probe disposed outside of the melting tank. Forming gas is continually moved into the sheath to keep the inside of the sheath at positive pressure, to thereby prevent infiltration of corrosive air into the annular space. Despite this measure being taken, the outer sheath of probes of the above-described type have deteriorated fairly rapidly (e.g. within six months) in actual practice, thereby necessitating that the entire thermocouple probe be discarded.

U.S. Pat. No. 3,923,552, issued to Parris and assigned to the assignee of the present invention, and herein incorporated by reference, teaches a thermocouple probe assembly which overcomes the above-stated shortcoming of the continuously purged thermocouple probes and which does not require purging. More particularly, the Parris patent teaches a novel means for joining the first and second portions of the outer sheath, which eliminates the previously mentioned brazed joint fracturing problem. An inert atmosphere is provided in the annular space between the inner and outer sheaths to further eliminate the presence of air in the probe. Although the Parris probe constitutes an advancement over the previously available probes, it is still subject to premature deterioration and resultant failure. Due to the operating inefficiencies occasioned by the failure and the subsequent costs of replacing spent thermocouple probes, it would be advantageous to have an improved thermocouple assembly having a longer operating life than the previously discussed presently available probes.

SUMMARY OF THE INVENTION

The present invention encompasses a thermocouple assembly including a thermocouple probe; an outer sleeve disposed in surrounding relation to a selected portion of the probe to form a first annular space between the outer surface of the probe and the inner surface of the sleeve; facilities for sealing the first annular space from atmosphere outside thereof; and, facilities for continuously moving a corrosion-inhibiting gas into, through, and out of the first annular space to thereby flush any infiltrating oxygen and/or alkali-sulfate corrosives out of the first annular space.

The present invention also encompasses a thermocouple assembly including an inner sheath having a closed-ended upper portion and an open-ended lower portion; a thermocouple element positioned in the inner sheath in such a manner as to define a first annular space between the thermocouple element and the inner sheath; facilities for forming a seal between the thermocouple element and the inner sheath at the open end of the inner sheath; an outer sleeve disposed in surrounding relation to a selected portion of the inner sheath to define a second annular space between the outer sleeve and the inner sheath; facilities for sealing the second annular space; and facilities for continuously moving a corrosion-inhibiting gas into, through, and out of the first and second annular spaces to thereby continuously flush any infiltrating oxygen and/or alkali-sulfate corrosives out of the first and second annular spaces.

DESCRIPTION OF THE INVENTION

Figures 1, 3:
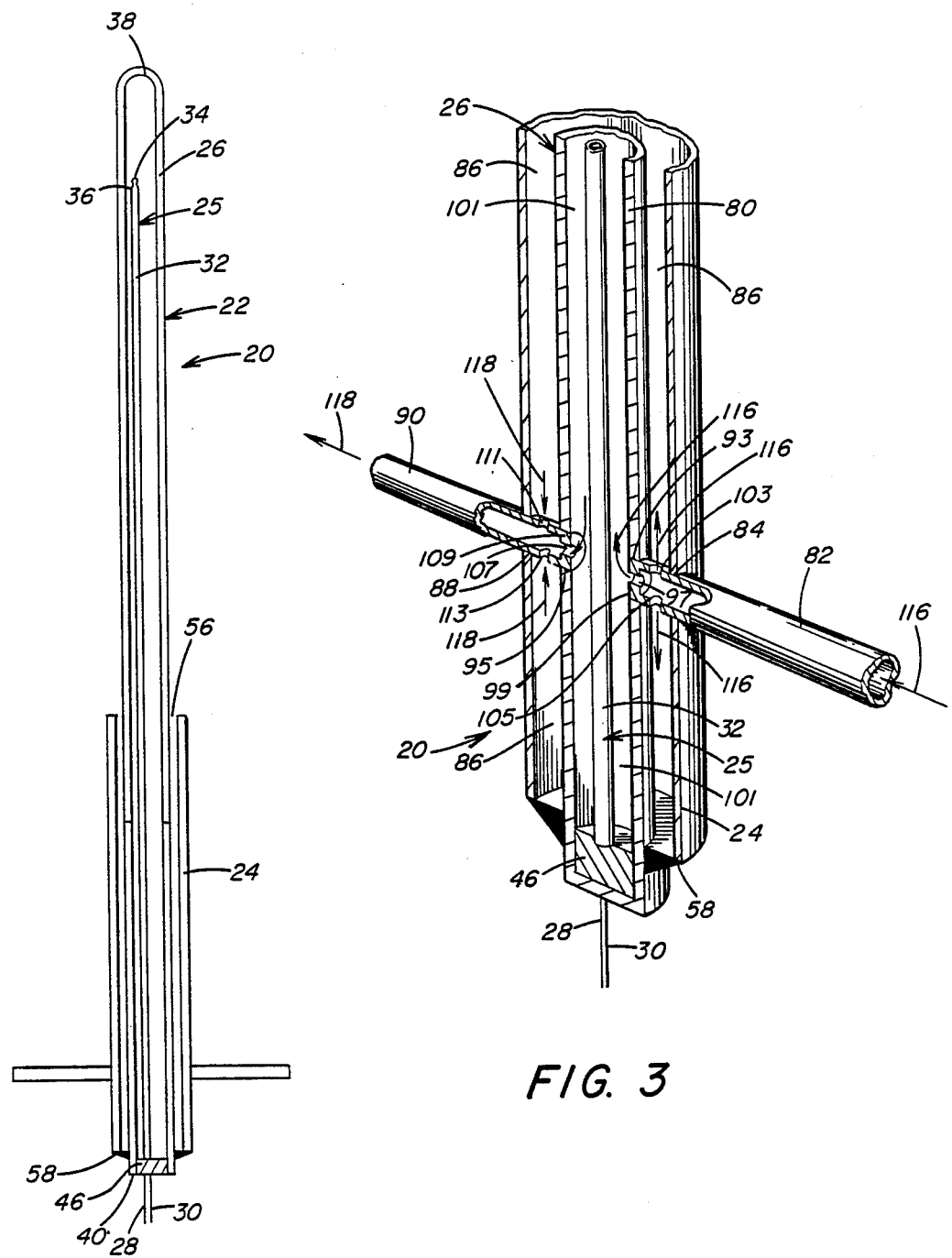
FIG. 1 is a cross-sectional, elevational view of a thermocouple assembly embodying features of the present invention.
FIG. 3 is a fragmentary, sectional, partially cutaway isometric view of an alternative embodiment of the thermocouple assembly shown in FIG. 1.

Referring now to FIG. 1, there can be seen a thermocouple assembly 20 embodying features of the instant invention. The thermocouple assembly 20 includes a thermocouple probe 22 having a protective outer sleeve 24 secured thereto. The thermocouple probe 22 preferably includes one or more thermocouple elements 25 (only one shown in FIG. 1) mounted within and wholly enclosed by an inner sheath 26. The type of thermocouple element(s) employed is not limiting to the invention. For example, each thermocouple element 25 may include a pair of fine gauge wires 28 and 30 inserted through longitudinal passageways (not shown) of a double-barreled ceramic tube 32. The wires 28 and 30 are electrically connected together to form a hot or measuring junction 34 at a point just beyond top end 36 of the tube 32. The wires 28, 30 may conveniently be made of, for example, a tungsten alloy containing 5% rhenium, and a tungsten alloy containing 26% rhenium, respectively, or respectively. However, it should be clearly understood that the composition of the wires 28, 30 is not limiting to the invention herein set forth. Top end 38 of the inner sheath 26 is closed and bottom end 40 of the inner sheath 26 is open, or at least provided with an opening(s), to allow passage of the wires 28 and 30 therethrough. The wires 28 and 30 are preferably longer than the ceramic tube 32, to preferably pass through a plug 46 adapted to hermetically seal the bottom end 40 of the inner sheath 26. The plug 46 is preferably made of a material, e.g. any of various well known epoxy resins which exhibit physical and chemical stability and no appreciable shrinkage at the elevated temperatures, e.g. about 600° F.–1,100° F., to which it will be subjected during use of the thermocouple assembly 20. Further, as is also well known in the art, the free ends of the wires 28 (not shown) and 30 are connected to a thermocouple connector block 48 or the like. A temperature indicating device (not shown) is advantageously connected to the connector block to indicate the temperature at the measuring junction 34, as will hereinafter be more fully appreciated.

Figure 2:
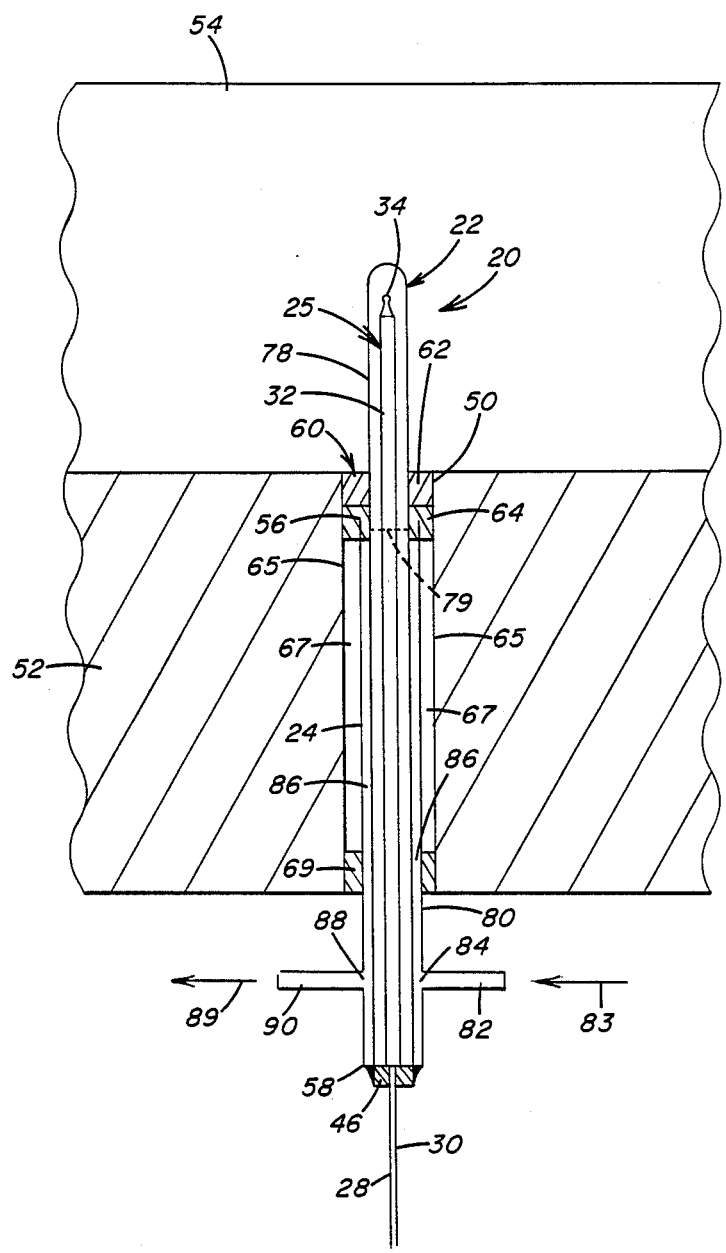
FIG. 2 is an elevational view depicting the thermocouple assembly shown in FIG. 1 mounted through the refractory bottom of a glass making furnace.

Referring additionally to FIG. 2, there can be seen a longitudinally oriented mounting hole 50 conveniently drilled or otherwise provided through a refractory wall, e.g. a side wall (not shown), or, preferably, through the refractory bottom 52 of the melting tank (not shown) of a glassmaking furnace (not shown). The melting tank contains a body or pool of molten glass 54 having a temperature ranging from about 2,100° F. to about 3,000° F., depending upon factors such as furnace operating parameters, type of glass being manufactured, and the location and depth within the molten glass 54 at which the temperature is measured. The thermocouple assembly 20 is inserted into the mounting hole 50 before any of the molten glass 54 from the tank is allowed to solidify or devitrify as it flows downwardly into the mounting hole 50. More particularly, the leading regions of the molten glass flowing into tha mounting hole 50 will be cooled as it moves away from the heat source, i.e. the interior of the melting tank, by the refractory bottom 52 and the atmosphere outside of the furnace which is allowed to enter into the mounting hole 50 through its initially open bottom end. As the molten glass in the mounting hole 50 cools to a temperature of about 2,000° F. it devitrifies. The thermocouple assembly 20 is therefore inserted before any appreciable portion of the molten glass 54 flowing into the mounting hole 50 is allowed to cool to this threshold temperature (i.e. about 2,000° F.). In the preferred embodiment depicted in FIG. 1, the protective outer sleeve 24 is open at its upper end 56 and closed and hermetically sealed at its lower end 58, e.g. by means of being welded to the adjacent peripheral surface of the inner sheath 26. The thermocouple assembly 20 is inserted into the mounting hole 50 only to a point at which the outer sleeve 24 is subjected to a temperature less than the devitrification temperature (i.e. less than about 2,000° F.). More particularly, the molten glass 54 which flows into the mounting hole 50 is allowed to form an annular glass plug 60 having an upper portion 62 constituted of molten glass and a lower portion 64 constituted of solidified or devitrified glass. The upper end 56 of the outer sleeve 24 is not allowed to contact the upper portion 62 of the glass plug 60, but is preferably disposed as near thereto as is feasible during insertion of the thermocouple assembly 20 into the mounting hole 50. The upper portion 62 of the glass plug 60 is disposed in the annular space between tha outer, circumferential surface of the adjacent portion of the inner sheath 26 and tha inner, circumferential surface 65 of the walls of the refractory bottom 52 forming the mounting hole 50. The lower portion 64 of the glass plug 60 is disposed between: (1) the outer, circumferential surface of the outer sleeve 24 about its upper end 56, and the inner circumferential surface 65 of the adjacent portion of the hole-forming walls of the refractory bottom 52; (2) the outer, circumferential surface of the inner sheath 26 and the inner, circumferential surface 65 of the adjacent portion of the hole-forming walls of the refractory bottom 52; and, (3) the inner, circumferential surface of the outer sleeve 24 and the outer, circumferential surface of the adjacent portion of the inner sheath 26. The devitrified glass constituting the lower portion 64 of the glass plug 60 sealingly interconnects the inner sheath 26 and the outer sleeve and further serves to securely support the thermocouple assembly 20 in a fixed orientation, e.g. a vertical orientation, within the mounting hole 50. Further, the annular space 67 between the outer sleeve 24 and the inner, circumferential surface 65 of the hole-forming walls of the refractory bottom 20 is closed at its bottom end by a refractory material, e. g. an annular plug 69 made of refractory cement or the like, which additionally functions to further secure the thermocouple assembly 20 in a fixed orientation, e.g. a vertical orientation, within the mounting hole 50. The thermocouple assembly 20 may be further supported in any convenient manner, e.g. by a mounting bracket (not shown) suitably attached to I-beams (not shown) which form part of a superstructure (not shown) which supports the melting tank.

In general, oxygen enters the annular space 67 by way of air from the atmosphere seeping past the annular plug 69 and by way of air permeating through the refractory bottom 20 passing through the walls forming the mounting hole 50. Further, the molten glass 54 volatilizes sodium and sulphur, among other things as it is being melted. Further, the sulphur and sodium given off in the above manner seeps past the lower portion 64 of the glass plug 60 into the annular space 67, because the seal afforded by the lower portion 64 of the glass plug 60 is not a hermetic seal. The volatilized sodium combines with oxygen at the high temperatures present in the space 67 to form alkali corrosives such as soda (NaO), and the volatilized sulphur combines with the oxygen to form corrosives such as sulphates. The term "alkali-sulfate corrosives" as used hereinafter is intended to encompass both alkali and sulphur corrosives such as those described above. Therefore, because of the highly corrosive, highly oxidizing, high temperature atmosphere occurring within the annular space 67, it is important that the outer sleeve 24 be fabricated of a material which is highly resistant to attack from these deleterious elements over a long period of time in order to maximize the useful/operating life of the thermocouple assembly 20. Stainless steel or stainless steel alloys are suitable materials for fabrication of the outer sleeve 24. Inconel or other high nickel content stainless steel alloys are preferred, and an alloy having a 99.5% NiO content is especially preferred, although this is not limiting to the present invention. It is also important that the inner sheath 26 be constructed of a high temperature, corrosion resistant refractory material. It is especially important that at least the portion of the inner sheath 26 which extends into the molten glass 54 be made of a material which does not readily react with oxygen in the molten glass 54 and which possesses sufficient structural strength at the temperatures of the molten glass to withstand movement of the molten glass thereover over a prolonged period of time. Many types of refractory metals are suitable materials for construction of the inner sheath 26, most notable of which is molybdenum, which is a preferred material for the practice of this invention. However, molybdenum generally oxidizes in air at temperatures above about 600° F. to about 800° F. Because of this phenomenon, it is preferred that the portion of the inner sheath 26 which is not in direct contact with the molten glass 54 be made of a material which is highly resistant to oxidation and alkali-sulfate corrosives at the elevated temperatures present within the mounting hole 50. The temperature within the mounting hole 50 generally ranges between about 500° F. at its lower end to about 2,700° F. at its upper end (i.e. in the molten glass 54). Stainless steel or stainless steel alloys are suitable materials for fabrication of the portion of the inner sheath 26 which is not in contact with the molten glass, and inconel is particularly preferred. Therefore, it is preferred that the inner sheath 26 have an upper portion 78 immersed within the molten glass 54, joined to a lower portion 80 free of any direct exposure to the molten glass 54, with the upper portion 78 being made of molybdenum or the like, and the lower portion 80 being made of stainless steel or the like, e.g. inconel. The upper and lower portions 78,80, respectively, of the inner sheath 26 may be connected or joined in any convenient manner, e.g. by means of brazing such as is taught in U.S. Pat. Nos. 3,923,552 issued to Parris and 3,537,911 issued to Hynd, which teachings are herein incorporated by reference. The joint 79 between the molybdenum upper portion 78 and the inconel lower portion 80 of the inner sheath 26 is preferably disposad as nearly to plug 60 as is feasible during insertion of the thermocouple assembly 20 into the mounting hole 50, e.g. the joint 79 may be disposed in direct contact with the lower portion 64 of the glass plug 60, but not in direct contact with the molten glass constituting the upper portion 62 of the glass plug 60, although the disposition of the joint 79 is not limiting to the present invention. Further, since molybdenum does react with the molten glass 54 at a slow rate, it is recommended that the wall thickness of at least the upper portion 78 of the inner sheath 26 be preferably greater than ¾ inch. However, it should be clearly understood that the composition of neither the thermocouple probe 22 nor the protective outer sleeve 24 is limiting to the invention. For example, the thermocouple probe 22 may be the entire thermocouple assembly as taught in the above-referenced Parris patent. Otherwise stated, the thermocouple assembly 20 of the present invention may be the thermocouple assembly taught in the Parris patent with the protective outer sleeve 24 secured thereto in order to provide additional, greater protection against oxidation and corrosive deterioration thereof, to thereby extend the useful life thereof, in a manner as will be hereinafter more fully developed. Alternatively, the inner sheath 26 may be a monolithic sheath made of molybdenum or the like. Further, although only one thermocouple element 25 is shown, it should be readily appreciated that two or more thermocouple elements may be mounted within the inner sheath 26 and terminated at different depths, to thereby provide a multi-depth thermocouple assembly such as is taught in the Parris patent.

Referring primarily now to FIG. 2, in accordance with a primary aspect of the present invention, a protective or corrosion-inhibiting gaseous medium is introduced in the direction of the arrow 83, via a gas supply or feeder pipe 82 through an aperture 84 provided through a first portion of the outer sleeve 24, into the annular space 86 between the outer, circumferential surface of the inner sheath 26 and the inner, circumferential surface of the outer sleeve 24. The gaseous medium is allowed to circulate throughout the annular space 86 before exiting through an aperture 88 provided through a second portion of the outer sleeve 24, to be carried off in the direction of the arrow 89, via an exhaust pipe 90 to a gas recovery system (not shown) or the like. The gaseous medium is preferably an inert gas such as nitrogen, argon, helium or the like, or a mixture of one or more inert gases, or alternatively, a reducing gas, e.g. forming gas (i.e. a nitrogen and hydrogen mixture). The gaseous medium is preferably delivered to the annular space 86 at a pressure greater than the atmospheric pressure outside of the annular space 86 (i.e. under positive pressure). Theoretically, the annular space 86 may be initially purged of unwanted, corrosive gases, and then filled until a positive pressure is attained. The pressure within the annular space 86 could then be continuously monitored, so that additional gas could be introduced whenever the pressure therein dropped, to thereby continuously maintain the annular space 86 under positive pressure, a practice referred to in the prior art as a continuous purging of this annular space. In principle, this measure should prevent any oxygen or alkali-sulfate corrosives from seeping into the annular space 86 because these corrosive gasses are at a lower pressure that the protective or purge gas contained within the annular space 86. However, in actual practice, this continuous purging measure is not completely successful. Therefore, in accordance with the instant invention, the protective gaseous medium is continuously moved through the annular space 86, preferably under positive pressure, at a flow rate of, for example, between about ½ cubic ft. to about 2 cubic ft. per hour. The actual flow rate employed is not limiting to the instant invention. The important aspect of this teaching is that the protective gas be continuously moved through the annular space 86 at a flow rate sufficient to continuously flush or expel any infiltrating oxygen and alkali-sulfate corrosives from the annular space 86. Further, since stainless steel alloys such as inconel are subject to alkali-sulfate corrosion and some oxidation at temperatures above about 1,100° F., the continuous movement of the protective gas through the annular space 86 provides a cooling effect which, it is believed, serves to cool the outer sleeve 24 and the lower portion 80 of the inner sheath 26, to thereby mitigate this corrosive phenomenon and prolong the operating life of the thermocouple assembly 20. Yet further, the outer sleeve 24 preferably surrounds at least the portion of the inner sheath 26 which is susceptible to oxidation and/or alkali-sulfate corrosion. Therefore, if the inner sheath 26 is a composite molybdenum-inconel sheath, then the outer sleeve 24 should be sealingly connected, e.g. welded, to the inconel lower portion 80 of the inner sheath 26 at a point below which the sheath 26 is at a temperature of about 1,100° F. However, if the lower portion 80 of the inner sheath 26 is made of molybdenum, for example, the outer sleeve 24 should be connected to the inner sheath 26 at a point below which the sheath 26 is at a temperature of between about 600° F. to about 800° F., since molybdenum, it is believed, is susceptible to oxidation and corrosion at temperatures above this range.

With the thermocouple assembly 20 of this invention as set forth hereinabove, it is believed that the primary mechanism for oxygen and/or alkali-sulfate corrosion is movement of corrosives from the annular space 67 between the outer sleeve 24 and the walls of the mounting hole 50, along the path represented by the curved arrow 91, i.e. between the inner and outer surfaces of the outer sleeve 24 and the adjacent portions of the lower portion 64 of the glass plug 60, and into the annular space 86. However, if the hermetic seal provided by the plug 46, or the sealed connection (e.g. the weld) between the outer sleeve 24 and the inner sheath 26 deteriorates or fails, these also become points of entry into the annular space 86 for unwanted corrosives. In any event, any corrosives which may nevertheless penetrate into the annular space 86 will be instantaneously flushed out by the protective gas being continuously moved through the annular space 86.

Referring now primarily to FIG. 3, there can be seen an alternative embodiment of the thermocouple assembly 20 of this invention, wherein the feeder pipe 82 extends transversely across the annular space 86 and is sealingly connected to the inner sheath 26, e.g. by way of aperture 93 provided through the lower portion 80 of the inner sheath 26 in directly opposed or aligned relation to the aperture 84 provided through the outer sleeve 24. Further, the exhaust pipe 90 also extends transversely across the annular space 86 and is sealingly connected to the inner sheath 26, e.g. by way of aperture 95, provided through the lower portion 80 of the inner sheath 26 in directly opposed or aligned relation to the aperture 88 provided through the outer sleeve 24. Yet further, an opening 97 is provided through the inner end 99 of the feeder pipe 82 in fluid communication with annular space 101 disposed between the outer, circumferential surface of the ceramic tube 32 of the thermocouple element 25, and the inner, circumferential surface of the inner sheath 26, e.g. the lower portion 80 of the inner sheath 26. Additionally, one or more openings, e.g. aligned openings 103, 105, are provided through the feeder pipe 82 to put the feeder pipe 82 in fluid communication with the annular space 86 disposed between the inner sheath 26 and the outer sleeve 24. Moreover, an opening 107 is provided through inner end 109 of the exhaust pipe 90 to put the exhaust pipe 90 in fluid communication with the annular space 101, and one or more openings, e.g. aligned openings 111, 113, are provided through the exhaust pipe 90 to put the exhaust pipe 90 in fluid communication with the annular space 86. In operation, the above-described alternative embodiment of the thermocouple assembly 20 of this invention works in the following manner. The corrosion-inhibiting gas, e.g. an inert or a reducing gas, is delivered, preferably under positive pressure, through the feeder pipe 82 into the annular spaces 86 and 101. A valve (not shown) associated with the exhaust pipe 90 is preferably closed to allow the annular spaces 86,101 to fill up with the corrosion-inhibiting gas. Thereafter, the valve is opened and the gas, represented by the arrows 116, is continuously moved through the annular spaces 86,101 via the feeder pipe 82 and the openings 97,103, and 105 provided therethrough, with the gas represented by the arrows 118, which is continuously displaced thereby being exhausted through the exhaust pipe 90 via the openings 107,111, and 113 provided therethrough. In this way, any oxygen and/or alkali-sulfate corrosives which may infiltrate the annular spaces 86 and/or 101 are continuously flushed therefrom through the exhaust pipe 90.

In general, the materials of construction for the outer sleeve 24 and the inner sheath 26, and the operating principles of the thermocouple assembly 20 of the instant invention are the same as those taught in co-pending U.S. patent application Ser. No. 717,940, now U.S. Pat. No. 4,600,425, entitled "Bubbler With Protective Sleeve or Fluid Coolant Jacket" and assigned to the assignee of the present invention, except that the referenced co-pending application relates to the bubbler art.

It should be appreciated that many variations and/or modifications of the basic inventive concepts herein taught which may appear to those skilled in the thermocouple art may still fall within the spirit and scope of the present invention, which should be defined solely on the basis of the following claims.

What is claimed is:

1. A thermocouple assembly in combination with a melting furnace for containing a body of molten glass, said melting furnace having refractory side and bottom walls, at least one of the walls having a hole therein in which the thermocouple assembly may be mounted, said thermocouple assembly comprising:

a thermocouple element having a junction;

a first sleeve having a closed first end and an opposite second end with said closed first end disposed in surrounding relation to a selected portion of said thermocouple element which portion includes said junction of said thermocouple element to form a sealed first annular space between outer surface of said selected portion of said thermocouple assembly and inner surface of said first sleeve;

a second sleeve having a first end and an opposite second end disposed in surrounding relation to a selected portion of said first sleeve with said first end of said second sleeve between said closed first end and said second end of said first sleeve and said second end of said second sleeve adjacent to and closer to said second end of said first sleeve than said closed first end of said first sleeve;

means for sealing said second end of said second sleeve to the first sleeve to provide a second annular space having a closed end adjacent said second end of said second sleeve and an open portion at said first end of said second sleeve to provide the thermocouple assembly;

means for securing the thermocouple assembly in the hole with said closed first end of said first sleeve extending into the molten glass and said second end of said second sleeve at or extending beyond outer surface of the wall having the hole;

means for sealing said first end of said second sleeve and space between said first end of said second sleeve and adjacent wall portion of the hole to provide a sealed second annular space; and means for moving a corrosion-inhibiting gas into, through, and out of at least one of said annular spaces to flush said at least one of said annular spaces.

2. The assembly as set forth in claim 1 wherein the refractory wall is the refractory bottom of the furnace, and wherein said means for sealing the first end of said second sleeve includes a portion of the body of molten glass that flowed into the mounting hole, the body of molten glass forms an annular glass plug having an upper portion comprised of molten glass and a lower portion comprised of devitrified glass.

3. The assembly as set forth in claim 2 wherein said second sleeve is made of a high-temperature, corrosion-resistant material.

4. The assembly as set forth in claim 3 wherein said second sleeve is made of a material selected from the group consisting of, stainless steel, nickel, and nickel alloys.

5. The assembly as set forth in claim 3 wherein upper end of said second sleeve is in contact with said annular glass plug.

6. The assembly as set forth in claim 1 wherein said first sleeve is made of a high-temperature, corrosion-resistant refractory material capable of withstanding direct exposure to the molten glass.

7. The assembly as set forth in claim 1, wherein upper portion and lower portion of said first sleeve are separate components each made of a high-temperature, corrosion-resistant refractory material, at least said upper portion material being capable of withstanding direct exposure to said molten glass, and further comprising means for joining said upper portion and said lower portion of said inner sheath.

8. The assembly as set forth in claim 7 wherein said material of said upper portion of said first sleeve is molybdenum.

9. The assembly as set forth in claim 8, wherein said lower portion of said first sleeve is made of a material selected from the group consisting of nickel, nickel alloys, and stainless steel.

10. The assembly set forth in claim 1 wherein said moving means comprises:
   a first opening provided through a first portion of said second sleeve;
   a second opening provided through a second portion of said second sleeve; and
   means for flowing a corrosion-inhibiting gas under pressure through said first opening into and through said second annular space and out of said second annular space through said second opening to flush any infiltrating oxygen and/or alkali-sulfate corrosives out of said second annular space.

11. The assembly set forth in claim 10 wherein said moving means further comprises:
   a first opening provided through a first portion of said first sleeve, wherein said first opening of said first sleeve is aligned with said first opening of said second sleeve;
   a second opening provided through a second portion of said first sleeve, wherein said second opening in said first sleeve is aligned with said second opening of said second sleeve;
   a feeder pipe passing through said first openings of said first and second sleeves;
   an exhaust pipe passing through said second openings of said first and second sleeves;
   one or more first apertures provided through said feeder pipe to put it in fluid communication with said second annular space;
   one or more second apertures provided through said exhaust pipe to put it in fluid communication with said second annular space; and
   said flow means flushes any infiltrating oxgen and/or alkali-sulfate corrosives out of said first annular space and said second annular space.

12. The assembly as set forth in claim 11, wherein said corrosion-inhibiting gas is selected from the group consisting of reducing gases and inert gases.

13. A method of positioning a thermocouple assembly in a glass melting furnace having a refractory bottom, comprising the steps of:
   providing a thermocouple assembly comprising:
      a thermocouple element having a junction;
      a first sleeve having a closed first end and an opposite second end the said closed first end disposed in surrounding relation to a selected portion of the thermocouple element which portion includes the junction of the thermocouple element to form a sealed first annular space between outer surface of the selected portion of the thermocouple assembly element and inner surface of the first sleeve;
      a second sleeve having a first end and an opposite second end disposed in surrounding relation to a selected portion of the first sleeve with the first end of the second sleeve between the closed first end and the second end of the first sleeve and the second end of said second sleeve adjacent to and spaced closer to the second end of said first sleeve than the closed first end of the first sleeve; and
      means for sealing the second end of the second sleeve to the first sleeve to provide a second annular space having a closed end adjacent the second end of the second sleeve and an open portion at the first end of the second sleeve to provide the thermocouple assembly;
   providing a hole in the refractory bottom;
   securing the thermocouple assembly in the hole with the closed end of the first sleeve extending into the molten glass and the second end of the second sleeve at or extending beyond outer surface of the bottom;
   flowing molten glass into the space between the refractory bottom and the first sleeve to seal the first end of the second sleeve to provide a sealed second annular space to position the thermocouple assembly in the furnace.

14. The method as set forth in claim 13 wherein the gas is moved through the first and second annular spaces.

15. The method as set forth in claim 13 wherein the gas removes infiltrating oxygen and/or alkali-sulfate corrosives out of the at least one annular space.

16. The method as set forth in claim 13 wherein the gas continuously flows through the at least one annular space.

* * * * *